United States Patent
Koyama et al.

(10) Patent No.: US 6,562,469 B2
(45) Date of Patent: May 13, 2003

(54) SILICONE COMPOSITION FOR FORMING CURED RELEASE COATINGS

(75) Inventors: Taku Koyama, Chiba Prefecture (JP); Nobuo Kaiya, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 10/024,062

(22) Filed: Dec. 18, 2001

(65) Prior Publication Data

US 2002/0123569 A1 Sep. 5, 2002

(30) Foreign Application Priority Data

Dec. 28, 2000  (JP) ........................................ 2000-400618

(51) Int. Cl.$^7$ ............................................... B32B 25/20
(52) U.S. Cl. ........................... 428/447; 528/15; 528/32; 528/31; 525/478; 428/449
(58) Field of Search .............................. 528/15, 32, 31; 525/478; 428/447, 449

(56) References Cited

U.S. PATENT DOCUMENTS 4,946,878 A  *  8/1990  Jensen et al.

FOREIGN PATENT DOCUMENTS

| EP | 1004632 A1 | 5/2000 | ............ C08L/83/04 |
| JP | 52-47485 | 12/1977 | ............ C09D/3/82 |
| JP | 7-258606 | 10/1995 | ......... C09D/183/05 |

* cited by examiner

Primary Examiner—Robert Dawson
Assistant Examiner—Kuo-Liang Peng
(74) Attorney, Agent, or Firm—Patricia M. Scaduto

(57) ABSTRACT

A solventless silicone composition for forming a cured release coating comprising (A) 100 parts by weight of a mixture comprising 99 to 90 parts by weight of (A-1) a linear diorganopolysiloxane having a viscosity of 5 to 1,000 mPa·s at 25° C., having both terminal ends of the molecular chain blocked by dimethylalkenylsiloxy groups, with an alkenyl group content of 0.2 to 10 mol % of all organic groups and 1 to 10 parts by weight of (A-2) a linear diorganopolysiloxane having a viscosity of 1,000 to 10,000 mPa·s at 25° C. having both terminal ends of the molecular chain blocked by trimethylsiloxy groups and having at least two pendant alkenyl groups bonded to silicon atoms, with an alkenyl group content of 0.05 to 0.5 mol % of all organic groups, (B) 3 to 50 parts by weight of an organohydrogenpolysiloxane having a viscosity of 1 to 1,000 mPa·s at 25° C. having at least three silicon-bonded hydrogen atoms per molecule, and (C) a catalytic amount of a platinum catalyst.

7 Claims, No Drawings

SILICONE COMPOSITION FOR FORMING CURED RELEASE COATINGS

FIELD OF THE INVENTION

The present invention relates to a silicone composition intended for forming cured release coatings, and more specifically relates to a solventless silicone composition for forming cured release coatings that is capable of forming on the surface of various substrate materials, such as various paper materials, laminated paper, synthetic resin film, metal foil, etc., cured coatings that are releasable from tacky substances.

BACKGROUND OF THE INVENTION

Cured coatings consisting of curable silicone compositions in which organopolysiloxane is the main component exhibit tacky substance-releasing properties and have been utilized for peel-away liners of pressure sensitive adhesive tape and pressure sensitive adhesive sheets. It should be noted that, in addition to the release properties, compositions of this type are often required to exhibit slip properties for use at the interface between paper and paper, plastic film and plastic film, or between paper and plastic film, and between paper, plastic film and the human hand. For this reason, numerous silicone compositions of the organic solvent solution type, aqueous emulsion type, etc., have been proposed as silicone compositions for forming cured release coatings exhibiting characteristics of this kind. However, although compositions of the former organic solvent solution type possess superior release properties, slip properties, and curing characteristics, due to the large amount of the organic solvent required, they have various problems, such as atmospheric pollution, adverse influence on the health of workers, and considerable expenditures required for solvent recovery equipment. Also, a disadvantage of the latter compositions of the aqueous emulsion type is the need for heating at an elevated temperature for a prolonged period of time to form coatings, which results in low productivity. In addition, there are other disadvantages such as the limited use of high molecular weight organopolysiloxanes due to difficulties in their emulsification as well as inferior characteristics as compared with compositions of the organic solvent solution type, which are due to the use of emulsifying agents.

On the other hand, a composition comprising vinyl-containing diorganopolysiloxane having a viscosity of 50 to 4,000 mPa·s at 25° C., organohydrogenpolysiloxane having at least three hydrogen atoms bonded to silicon atoms per one molecule, a platinum catalyst, and an activity inhibitor (see Japanese Patent Publication No. Sho 52(1977)-047485) is an example of a solventless silicone composition for forming cured release coatings that does not utilize organic solvents or water. However, a disadvantage of cured coatings formed using this composition is their poorer slip properties as compared with coatings formed using the above-mentioned compositions of the organic solvent solution type, as a result of which their use has been limited. In addition, a solventless silicone composition comprising a mixture of 100 to 50 parts by weight of a vinyl-containing polysiloxane having both terminal ends of the molecular chain blocked by trialkylsiloxy groups and 0 to 50 parts by weight of a dimethylvinylsiloxy-endblocked vinyl-containing polysiloxane, a methylhydrogenpolysiloxane, and a platinum catalyst (see Japanese Patent Application Publication No. Hei 07(1995)-258606) is also known.

Although the composition exhibited improvements in terms of slip properties, it was far from sufficient, and because its curability is low as well, the composition can not satisfy certain applications. For example, when the composition was used as a release agent for Kraft tape, due to the insufficient slip properties, when the tape was applied to corrugated fiberboard etc., frictional resistance between the tape and hands increased, as a result of which there were hand injuries or the force used for the application of the tape was insufficient and the pressure sensitive adhesive did not firmly adhere to the corrugated fiberboard and peeling occurred over time. In addition, there have been attempts to use methods, in which dimethylsiloxane oil, polyether-modified silicone oils, surface active agents, and waxes were added in order to improve slip properties, but their disadvantage was the decreased adhesive strength of the pressure sensitive adhesive agent due to the migration of some of the additives to the surface of the cured coating.

It is an object of the present invention to provide a silicone composition for forming cured release coatings which is superior in curability, and after curing is capable of forming on the surface of various substrate materials, such as paper and plastic film, cured coatings that possess superior release properties and slip properties and do not reduce the pressure sensitive adhesive characteristics of pressure sensitive substances.

SUMMARY OF THE INVENTION

The present invention relates to an essentially solventless silicone composition for forming cured release coatings comprising
(A) 100 parts by weight of a mixture comprising 99 to 90 parts by weight of (A-1) a linear diorganopolysiloxane having a viscosity of 5 to 1,000 mPa·s at 25° C., having both terminal ends of the molecular chain blocked by dimethylalkenylsiloxy groups, with an alkenyl group content of 0.2 of 10 mol % of all organic groups and 1 to 10 parts by weight of (A-2) a linear diorganopolysiloxane having a viscosity of 1,000 to 10,000 mPa·s at 25° C. and having both terminal ends of the molecular chain blocked by trimethylsiloxy groups and having at least two pendant alkenyl groups bonded to silicon atoms, with an alkenyl group content of 0.05 to 0.5 mol % of all organic groups,
(B) 3 to 50 parts by weight of an organohydrogenpolysiloxane having a viscosity of 1 to 1,000 mPa·s at 25° C. and having at least three silicon-bonded hydrogen atoms per molecule, and
(C) a catalytic amount of a platinum catalyst.

DESCRIPTION OF THE INVENTION

The present invention relates to an essentially solventless silicone composition for forming cured release coatings. The composition comprises
(A) 100 parts by weight of a mixture comprising 99 to 90 parts by weight of (A-1) a linear diorganopolysiloxane having a viscosity of 5 to 1,000 mPa·s at 25° C., having both terminal ends of the molecular chain blocked by dimethylalkenylsiloxy groups, with an alkenyl group content of 0.2 of 10 mol % of all organic groups and 1 to 10 parts by weight of (A-2) a linear diorganopolysiloxane having a viscosity of 1,000 to 10,000 mPa·s at 25° C., having both terminal ends of the molecular chain blocked by trimethylsiloxy groups and having at least two pendant alkenyl groups bonded to silicon atoms, with an alkenyl group content of 0.05 to 0.5 mol % of all organic groups,
(B) 3 to 50 parts by weight of an organohydrogenpolysiloxane having a viscosity of 1 to 1,000 mPa·s at 25° C.

and having at least three silicon-bonded hydrogen atoms per molecule, and (C) a catalytic amount of a platinum catalyst.

The composition of the present invention will now be explained in detail. Component (A-1), which is the main component of the present composition, is a linear diorganopolysiloxane having both terminal ends of the molecular chain blocked by dimethylalkenylsiloxy groups, with an alkenyl group content of 0.2 to 10 mol % of all organic groups of (A-1). Diorganopolysiloxanes described by general formula

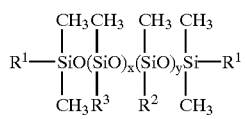

are suggested as component (A-1). In the formula, $R^1$ and $R^2$ are alkenyl groups exemplified by vinyl, butenyl, hexenyl, octenyl, and decenyl. Among these, vinyl and hexenyl are preferable. $R^3$ is a monovalent hydrocarbon group other than alkenyl, exemplified by methyl, ethyl, butyl, and other alkyl groups; phenyl, tolyl, and other aryl groups; cyclohexyl and other cycloalkyl groups. The subscript x is an integer of 1 or greater and y is an integer of 0 or greater, preferably within such a range that $0 \leq y/(x+y) \leq 0.2$. The value of (x+y) is such that the viscosity of (A-1) at 25° C. is 5 to 1,000 mPa·s and preferably within the range of 50 to 600 mPa·s. Exemplary of component (A-1) are dimethylpolysiloxane having both terminal ends blocked by dimethylvinylsiloxy groups, dimethylsiloxane-methylvinylsiloxane copolymer having both terminal ends blocked by dimethylvinylsiloxy groups, dimethylsiloxane-methylphenylsiloxane copolymer having both terminal ends blocked by dimethylvinylsiloxy groups, dimethylpolysiloxane having both terminal ends blocked by dimethylhexenylsiloxy groups, dimethylsiloxane-methylhexenylsiloxane copolymer having both terminal ends blocked by dimethylhexenylsiloxy groups, and dimethylsiloxane-methylhexenylsiloxane copolymer having both terminal ends blocked by dimethylvinylsiloxy groups. Such organopolysiloxanes can be used as component (A-1) singly, or as a mixture of two or more organopolysiloxanes. Component (A-2), which is used to impart slip properties to cured coatings of the present composition, is a linear diorganopolysiloxane having both terminal ends of the molecular chain blocked by trimethylsiloxy groups, with an alkenyl group content of 0.05 to 0.5 mol % of all organic groups of (A-2). Dimethylsiloxane-methylalkenylsiloxane copolymers having both terminal ends blocked by trimethylsiloxy groups described by formula

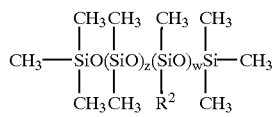

are suggested as component (A-2). In the formula, $R^2$ is the same as above. The subscript w is a positive integer satisfying $6 \geq w \geq$, z is a number such that the content of $R^2$ is 0.05 to 0.5 mol % of all organic groups of (A-2). This is dictated by fact that when w is less than 2, component (A-2) partially bleeds through to the surface of cured coatings and reduces the adhesive strength of the pressure sensitive adhesive agent, and when it exceeds 6, there is a decrease in slip properties. The value of (z+w) is such that the viscosity of (A-2) at 25° C. is 1,000 to 10,000 mPa·s, preferably 3,000 to 8,000 mPa·s. This is dictated by the fact that when the viscosity of component (A-2) is less than 1,000 mPa·s, slip properties are not displayed, and when it exceeds 10,000 mPa·s, the viscosity of the composition increases and its coating properties deteriorate.

Component (A) is a mixture of 99 to 90 parts by weight of component (A-1) and 1 to 10 parts by weight of component (A-2); it is preferable, however, to mix 94 to 98 parts by weight of component (A-1) with 6 to 2 parts by weight of component (A-2).

The organohydrogenpolysiloxane of component (B) serves as a cross-linking agent. The organohydrogenpolysiloxane has at least three silicon-bonded hydrogen atoms per molecule, there being no particular limitations concerning their bonding positions. In addition to the hydrogen atoms, monovalent hydrocarbon groups free from aliphatic unsaturated bonds, such as methyl, ethyl, propyl, butyl, pentyl, hexyl, and other alkyl groups; phenyl, tolyl, xylyl, and other aryl groups; benzyl, phenethyl, and other aralkyl groups, are suggested as organic groups bonded to silicon atoms. The viscosity of component (B) at 25° C. is 1 to 1,000 mPa·s. The amount of component (B) that is to be used is in the range of 3 to 50 parts by weight per 100 parts by weight of component (A). This is dictated by the fact that the cure of the present composition is insufficient when the amount of component (B) is less than 3 parts by weight and the release resistance of the cured coating changes over time when it exceeds 50 parts by weight.

The platinum catalyst of component (C), which promotes the cure of the present composition, is exemplified by platinum in the form of platinum black, platinum on a silica carrier, and platinum on activated carbon, as well as platinum compounds, such as chloroplatinic acid, alcohol solutions of chloroplatinic acid, complexes of chloroplatinic acid and olefins, and complexes of chloroplatinic acid and alkenylsiloxanes. The amount of component (C) that is to be used is a catalytic amount, preferably an amount sufficient to provide a platinum metal content of 1 to 1,000 ppm based on the total weight of component (A) and component (B).

The present composition comprises the above-mentioned component (A) to component (C), but in addition to these components, components publicly known as additives to silicone compositions for forming cured release coatings, such as 3-methyl-1-butyn-3-ol, 1-ethynyl-1-cyclohexanol, phenylbutynol, benzotriazole, and other cure retardants, finely divided silica, and other inorganic fillers, pigments, heat resistant additives, organic resin powders, and dyes may be added thereto insofar as the objects of the invention are not impaired. The amount of the cure retardants that is to be added is preferably 0.01 to 2 parts by weight per 100 weight parts of the total weight of component (A) and component (B). From the standpoint of coating properties, the viscosity of the present composition at 25° C. is preferably in the range of 50 to 1,000 mPa·s, because a viscosity in this range permits coating without using organic solvents.

The present composition can be easily prepared by uniformly mixing the above-mentioned component (A) to component (C). In this case, it is preferable to mix component (A) with component (B) and then add component (C) or component (C) and a cure retardant.

When coated and cured on the surface of various substrate materials, such as various paper materials, laminated paper, and synthetic resin film, the present composition forms on the surface of these substrate materials release coatings that are releasable from pressure sensitive adhesive substances, and, moreover, a characteristic feature of these coatings is that they possess superior slip properties and do not decrease the pressure sensitive adhesive characteristics of the pressure sensitive adhesive substances. In addition, the present composition contains essentially no organic solvents, and for this reason it has the advantage of being preferable from the standpoint of environmental protection and workplace environment improvement. In addition, the present invention has the advantage of permitting control over the release resistance value at low and high release velocities by varying the compounding ratio of the above-mentioned component (A) and component (B). These advantages make the present composition useful as a release agent for Kraft tape. Also, the present composition can be used as a release coating material for applications other than release liners.

APPLICATION EXAMPLES

The present invention is explained in detail by referring to application examples. Viscosity values provided in the application examples were measured at 25° C. The determination of release resistance values, kinetic coefficients of friction, silicone migration, and residual adhesion (%) of the cured coatings was carried out in accordance with the methods described hereinbelow.

Release Resistance Value

A specified amount of the silicone composition for forming cured release coatings was coated on a paper surface and a cured coating was allowed to form thereon. A pressure sensitive adhesive agent (available from Toyo Ink Mfg. Co., Ltd., trade name: Oribain BPS5127) was coated on the surface of the coating and dried by heating at a temperature of 70° C. for two minutes. Subsequently, liner paper was applied thereto and the assembly was left stand for 24 hours at a temperature of 25° C. and a humidity of 60% under a load of 196.2 mN/cm². Next, using a Tensilon tester and a high speed release tester, the force (mN) required for peeling the liner paper off was measured by pulling it back at an angle of 180° at a speed of 0.3 m/min and 100 m/min. All samples had a width of 2.5 cm.

Kinetic Coefficient of Friction

Release paper was fabricated by coating a specified amount of the silicone composition on a paper surface and allowing it to cure thereon. The release paper was attached, with its release surface facing up, to the specimen mounting platform of a high speed release tester. In addition, release paper manufactured in the same manner was attached, with its release paper surface facing outward, to a 5 cm×5 cm×1 cm specimen holder and secured thereto, and a load of 1.962 N was applied to the surface of the release paper on the specimen mounting platform. Using the high speed release tester, the specimen holder was pulled away at a speed of 10 m/min while measuring the required resistance (N). The kinetic coefficient of friction was calculated from the resistance value based on the following equation 1. The smaller the value, the better the slip properties.

$$\text{Kinetic coefficient of friction} = \frac{\text{Force}(N) \text{ required to pull away specimen holder with release paper attached thereto}}{\text{Load}(1.962N)} \quad \text{Eq. 1}$$

Residual Adhesion

A specified amount of the silicone composition was coated on a paper surface and a cured coating was allowed to form thereon. Pressure sensitive adhesive tape (available from Nitto Denko Corporation, trade name: Nitto Polyester PSA Tape 31B) was applied to the surface of the coating and ageing was conducted for 20 hours at 70° C. under a load of 196.2 mN/cm². Next, the pressure sensitive tape was peeled off, applied to a stainless steel plate, and left stand for 30 minutes at 25° C. under a load of 196.2 mN/cm², whereupon the pressure sensitive adhesive tape was pulled back at an angle of 180° at a speed of 0.3 m/min while measuring the force (mN) required for peeling. In addition, as a blank test, the above-mentioned pressure sensitive adhesive tape was applied to a Teflon sheet and the force (mN) required for the peeling of the pressure sensitive adhesive tape was measured in the same manner as described above. Residual adhesion (%) was calculated from these values in accordance with the following equation 2.

$$\text{Residual adhesion (\%)} = \frac{\text{Force}(mN) \text{ required for peeling the sample PSA tape}^* \text{ from a stainless steel}}{\text{Force}(mN) \text{ required for peeling the control PSA tape}^{**} \text{ from a stainless steel}} \quad \text{Eq. 2}$$

*the sample PSA tape is peeled off from the cured coating of silicone composition.

**the control PSA tape is peeled off from the Teflon sheet after aging.

Silicone Migration

Release paper was fabricated by coating a specified amount of the silicone composition on a paper surface and allowing it to cure thereon. A clean piece of polyester film was applied to the surface of the release paper and the assembly was allowed to stand for 30 minutes at 25° C. under a load of 981 N/cm² applied with a press. Subsequently, the polyester film was peeled off and lines were drawn with Magic Ink (registered trademark) on the surface of the polyester film that had been in contact with the release paper, and the degree of crawling of the ink was measured. The absence of ink crawling was considered as an indication that silicone migration had not occurred, and the presence of ink crawling was considered as an indication that silicone migration had occurred.

Application Example 1

A vinyl-containing diorganopolysiloxane (vinyl group content: 3.1 mol %) mixture with a viscosity of 250 mPa·s was obtained by mixing 20 parts by weight of a dimethylsiloxane-methylvinylsiloxane copolymer with a viscosity of 10,000 mPa·s having both terminal ends of the molecular chain blocked by dimethylvinylsiloxy groups (dimethylsiloxane units: 98 mol %, methylvinylsiloxane units: 2 mol %) with 67.2 parts by weight of polydimethylsiloxane with a viscosity of 60 mPa·s having both terminal ends of the molecular chain blocked by dimethylvinylsiloxy groups. Subsequently, 3.5 parts by weight of dimethylsiloxane-methylhexenylsiloxane copolymer with a viscosity of 7,000 mPa·s having both terminal ends of the molecular chain blocked by trimethylsiloxy groups (dimethylsiloxane units: 99.6 mol %, methylhexenylsiloxane units: 0.4 mol %), 9 parts by weight of a methylhydrogenpolysiloxane with a viscosity of 20 mPa·s having both terminal ends of the molecular chain blocked by trimethylsiloxy groups, and 0.3 parts by weight of 1-ethynyl-1-cyclohexanol were added and uniformly mixed therewith. A silicone composition for forming cured release coatings with a viscosity of 270 mPa·s was prepared by further adding and blending with the mixture a complex of chloroplatinic acid and 1,3-divinyltetramethyldisiloxane in a quantity that provided a platinum metal content of 100 ppm.

The resultant silicone composition for forming cured release coatings was coated on the surface of polyethylene-laminated wood-free paper with a coatweight of about 1 g/m², and a cured coating was subsequently formed by heat treating it for 30 seconds at 150° C. The release resistance value, kinetic coefficient of friction, silicone migration, and residual adhesion of the cured coating were measured. The results are shown in Table 1.

Comparative Example 1

A silicone composition for forming cured release coatings was prepared in the same manner as in Application Example 1, except that a polydimethylsiloxane with a viscosity of 7,000 mPa·s having both terminal ends of the molecular chain blocked by trimethylsiloxy groups was added instead of the dimethylsiloxane-methylhexenylsiloxane copolymer with a viscosity of 7,000 mPa·s having both terminal ends of the molecular chain blocked by trimethylsiloxy groups (dimethylsiloxane units: 99.6 mol %, methylhexenylsiloxane units: 0.4 mol %) used in Application Example 1.

The resultant silicone composition for forming cured release coatings was coated on the surface of polyethylene-laminated wood-free paper with a coatweight of about 1 g/m², and a cured coating was subsequently formed by heat treating it for 20 seconds at 130° C. The release resistance value, kinetic coefficient of friction, silicone migration, and residual adhesion of the cured coating were measured. The results are shown in Table 1.

Comparative Example 2

A silicone composition for forming cured release coatings was prepared in the same manner as in Application Example 1, except that a dimethylsiloxane-methylhexenylsiloxane copolymer with a viscosity of 7,000 mPa·s having both terminal ends of the molecular chain blocked by trimethylsiloxy groups (dimethylsiloxane units: 98 mol %, methylhexenylsiloxane units: 2 mol %) was added instead of the dimethylsiloxane-methylhexenylsiloxane copolymer with a viscosity of 7,000 mPa·s having both terminal ends of the molecular chain blocked by trimethylsiloxy groups (dimethylsiloxane units: 99.6 mol %, methylhexenylsiloxane units: 0.4 mol %) used in Application Example 1.

The resultant silicone composition for forming cured release coatings was coated on the surface of polyethylene-laminated wood-free paper with a coatweight of about 1 g/m², and a cured coating was subsequently formed by heat treating it for 20 seconds at 130° C. The release resistance value, kinetic coefficient of friction, silicone migration, and residual adhesion of the cured coating were measured. The results are shown in Table 1.

Comparative Example 3

A silicone composition for forming cured release coatings was prepared in the same manner as in Application Example 1, except that a dimethylsiloxane-methylvinylsiloxane copolymer with a viscosity of 500 mPa·s having both terminal ends of the molecular chain blocked by dimethylvinylsiloxy groups (dimethylsiloxane units: 99.5 mol %, methylvinylsiloxane units: 0.5 mol %) was added instead of the dimethylsiloxane-methylhexenylsiloxane copolymer with a viscosity of 7,000 mPa·s having both terminal ends of the molecular chain blocked by trimethylsiloxy groups (dimethylsiloxane units: 99.6 mol %, methylhexenylsiloxane units: 0.4 mol %) used in Application Example 1.

The resultant silicone composition for forming cured release coatings was coated on the 2 surface of polyethylene-laminated wood-free paper with a coatweight of about 1 g/m², and a cured coating was subsequently formed by heat treating it for 20 seconds at 130° C. The release resistance value, kinetic coefficient of friction, silicone migration, and residual adhesion of the cured coating were measured. The results are shown in Table 1.

Application Example 2

7 Parts by weight of dimethylsiloxane-methylhexenylsiloxane copolymer with a viscosity of 4,000 mPa·s having both terminal ends of the molecular chain blocked by trimethylsiloxy groups (dimethylsiloxane units: 99.6 mol %, methylhexenylsiloxane units: 0.4 mol %), 9 parts by weight of a methylhydrogenpolysiloxane with a viscosity of 20 mPa·s having both terminal ends of the molecular chain blocked by trimethylsiloxy groups, and 0.3 parts by weight of 1-ethynyl-1-cyclohexanol were added and uniformly mixed with 83.7 parts by weight of a dimethylsiloxane-methylvinylsiloxane copolymer with a viscosity of 400 mPa·s having both terminal ends of the molecular chain blocked by dimethylvinylsiloxy groups (dimethylsiloxane units: 96 mol %, methylvinylsiloxane units: 4 mol %). Subsequently, a silicone composition for forming cured release coatings with a viscosity of 400 mPa·s was prepared by adding and blending therewith a complex of chloroplatinic acid and 1,3-divinyltetramethyldisiloxane in a quantity that provided a platinum metal content of 100 ppm.

The resultant silicone composition for forming cured release coatings was coated on the surface of polyethylene-laminated wood-free paper with a coatweight of about 1 g/m², and a cured coating was subsequently formed by heat treating it for 20 seconds at 130° C. The release resistance value, kinetic coefficient of friction, silicone migration, and residual adhesion of the cured coating were measured. The results are shown in Table 1.

Application Example 3

A silicone composition for forming cured release coatings with a viscosity of 500 mPa·s was prepared in the same manner as in Application Example 2, except that a dimethylsiloxane-methylhexenylsiloxane copolymer with a viscosity of 8,000 mPa·s having both terminal ends of the molecular chain blocked by trimethylsiloxy groups (dimethylsiloxane units: 99.8 mol %, methylhexenylsiloxane units: 0.2 mol %) was added instead of the dimethylsiloxane-methylhexenylsiloxane copolymer with a viscosity of 4,000 mPa·s having both terminal ends of the molecular chain blocked by trimethylsiloxy groups (dimethylsiloxane units: 99.6 mol %, methylhexenylsiloxane units: 0.4 mol %) used in Application Example 2.

The resultant silicone composition for forming cured release coatings was coated on the surface of polyethylene-laminated wood-free paper with a coatweight of about 1 g/m², and a cured coating was subsequently formed by heat treating it for 20 seconds at 130° C. The release resistance value, kinetic coefficient of friction, silicone migration, and residual adhesion of the cured coating were measured. The results are shown in Table 1.

Comparative Example 4

9 Parts by weight of a methylhydrogenpolysiloxane with a viscosity of 20 mPa·s having both terminal ends of the molecular chain blocked by trimethylsiloxy groups and 0.3 parts by weight of 1-ethynyl-1-cyclohexanol were added and uniformly mixed with 90.7 parts by weight of a dimethylsiloxane-methylvinylsiloxane copolymer with a viscosity of 400 mPa·s having both terminal ends of the molecular chain blocked by dimethylvinylsiloxy groups (dimethylsiloxane units: 96 mol %, methylvinylsiloxane units: 4 mol %). Subsequently, a silicone composition for forming cured release coatings was prepared by adding and blending therewith a complex of chloroplatinic acid and 1,3-divinyltetramethyldisiloxane in a quantity that provided a platinum metal content of 100 ppm.

The resultant silicone composition for forming cured release coatings was coated on the surface of polyethylene-laminated wood-free paper with a coatweight of about 1 g/m$^2$, and a cured coating was subsequently formed by heat treating it for 20 seconds at 130° C. The release resistance value, kinetic coefficient of friction, silicone migration, and residual adhesion of the cured coating were measured. The results are shown in Table 1.

TABLE 1

|  | Release resistance value (mN/2.5 cm) | | Kinetic coefficient of friction | Residual adhesion (%) | Silicone migration |
| --- | --- | --- | --- | --- | --- |
|  | 0.3 m/min | 100 m/min |  |  |  |
| Application Example 1 | 190 | 560 | 0.430 | 96 | None |
| Application Example 2 | 170 | 530 | 0.420 | 96 | None |
| Application Example 3 | 170 | 510 | 0.405 | 96 | None |
| Comparative Example 1 | 160 | 590 | 0.410 | 90 | Present |
| Comparative Example 2 | 190 | 540 | 0.630 | 97 | None |
| Comparative Example 3 | 190 | 570 | 0.595 | 95 | None |
| Comparative Example 4 | 170 | 490 | 0.640 | 97 | None |

We claim:

1. A solventless silicone composition for forming a cured release coating comprising (A) 100 parts by weight of a mixture comprising 99 to 90 parts by weight of (A-1) a linear diorganopolysiloxane having a viscosity of 5 to 1,000 mPa·s at 25° C., having both terminal ends of the molecular chain blocked by dimethylalkenylsiloxy groups, with an alkenyl group content of 0.2 to 10 mol % of all organic groups and 1 to 10 parts by weight of (A-2) a linear diorganopolysiloxane having a viscosity of 1,000 to 10,000 mPa·s at 25° C. having both terminal ends of the molecular chain blocked by trimethylsiloxy groups and having at least two pendant alkenyl groups bonded to silicon atoms, with an alkenyl group content of 0.05 to 0.5 mol % of all organic groups, (B) 3 to 50 parts by weight of an organohydrogenpolysiloxane having a viscosity of 1 to 1,000 mPa·s at 25° C. having at least three silicon-bonded hydrogen atoms per molecule, and (C) a catalytic amount of a platinum catalyst.

2. A composition according to claim 1, where the alkenyl groups of component (A-1) and component (A-2) are independently selected from the group consisting of vinyl and hexenyl.

3. A composition according to claim 1, where the viscosity of component (A-1) is within a range of 50 to 600 mPa·s at 25° C.

4. A composition according to claim 1, where the viscosity of component (A-2) is 3,000 to 8,000 mPa·s at 25° C.

5. A composition according to claim 1, where component (A) comprises 98 to 94 parts by weight of component (A-1) and 2 to 6 parts by weight of component (A-2).

6. A composition according to claim 1 having a viscosity in the range of 50 to 1,000 mPa·s at 25° C.

7. A release coating formed by coating and curing the composition of claim 1 on a substrate.

* * * * *